(12) United States Patent
Bernard et al.

(10) Patent No.: US 10,230,548 B2
(45) Date of Patent: Mar. 12, 2019

(54) SYSTEMS AND METHODS FOR COMMUNICATING WITH ELECTRIC MOTORS

(71) Applicant: Regal Beloit America, Inc., Beloit, WI (US)

(72) Inventors: Brian Steven Bernard, Dayton, OH (US); Paul Steven Mullin, Yellow Springs, OH (US); Srinivas Chandu Kutcherlapati, Cassville, MO (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/338,834

(22) Filed: Jul. 23, 2014

(65) Prior Publication Data

US 2016/0028559 A1 Jan. 28, 2016

(51) Int. Cl.
*H02P 25/18* (2006.01)
*H04L 25/02* (2006.01)
*H04B 3/54* (2006.01)
*H04L 25/49* (2006.01)
*H02P 23/00* (2016.01)
*H02P 5/74* (2006.01)

(52) U.S. Cl.
CPC ...... *H04L 25/0264* (2013.01); *H02P 23/0077* (2013.01); *H02P 25/18* (2013.01); *H04B 3/542* (2013.01); *H04L 25/4902* (2013.01); *H02P 5/74* (2013.01)

(58) Field of Classification Search
CPC ...... G06F 17/50; G06F 19/12; G06F 19/3456; G02C 13/001; G02C 13/005
See application file for complete search history.

(56) References Cited

U.S. PATENT DOCUMENTS 4,031,528 A 6/1977 Harrison
4,222,035 A 9/1980 Lohoff
(Continued)

FOREIGN PATENT DOCUMENTS

CN 103064349 A 4/2013

OTHER PUBLICATIONS

ISR for PCT/US15/41181 mailed Oct. 23, 2015, 2 pages.
Extended European Search Report dated Feb. 26, 2018; Application No. 15825569.5-1202/3170225; PCT/US2015041181; 9 pages.

*Primary Examiner* — Shawki S Ismail
*Assistant Examiner* — Zoheb Imtiaz
(74) *Attorney, Agent, or Firm* — Armstrong Teasdale LLP

(57) ABSTRACT

A motor controller for an electric motor is described. The motor controller is coupled to a power line communication connection and includes a communication device coupled to a memory device. The motor controller is configured to receive, using the communication device, a status query from a server computing device via the power line communication connection. The motor controller is additionally configured to transmit electric motor diagnostic data from the memory device to the server computing device via the power line communication connection. The motor controller is further configured to receive motor configuration data from a client computing device wirelessly coupled to the motor controller. The motor configuration data is for controlling the electric motor. The motor controller is also configured to operate the electric motor in accordance with the motor configuration data.

14 Claims, 4 Drawing Sheets

(56) References Cited

U.S. PATENT DOCUMENTS

| | | | |
|---|---|---|---|
| 6,107,767 | A | 8/2000 | Lu et al. |
| 7,327,221 | B1 | 2/2008 | Callaghan |
| 8,598,833 | B2 | 12/2013 | Jeung |
| 2002/0000092 | A1 | 1/2002 | Sharood et al. |
| 2002/0067084 | A1 | 6/2002 | Jung et al. |
| 2004/0158371 | A1* | 8/2004 | Iggulden ............ B60R 16/0231 379/102.03 |
| 2004/0217861 | A1* | 11/2004 | Castle ................... G01V 3/104 340/551 |
| 2006/0293788 | A1 | 12/2006 | Pogodin |
| 2007/0200722 | A1 | 8/2007 | Piety et al. |
| 2007/0257789 | A1* | 11/2007 | Juel ........................ G08B 3/10 340/506 |
| 2008/0094015 | A1* | 4/2008 | Royak ................ H02P 21/0025 318/432 |
| 2009/0261651 | A1* | 10/2009 | Godecke et al. |
| 2009/0315496 | A1* | 12/2009 | Jeung ...................... H02P 31/00 318/558 |
| 2010/0134058 | A1 | 6/2010 | Nagashima et al. |
| 2013/0082115 | A1 | 4/2013 | May et al. |
| 2013/0175248 | A1* | 7/2013 | De Rosa ............. B23K 9/0956 219/130.01 |
| 2013/0198442 | A1* | 8/2013 | Braun .................. G05B 19/042 711/103 |
| 2014/0079564 | A1 | 3/2014 | Becerra et al. |
| 2014/0082702 | A1 | 3/2014 | Supalla |
| 2014/0091737 | A1 | 4/2014 | Davis |
| 2015/0239546 | A1* | 8/2015 | Limseth ....................... 318/400 |
| 2016/0004810 | A1* | 1/2016 | Solodovnik ............ H02M 1/44 703/7 |

\* cited by examiner

SYSTEMS AND METHODS FOR COMMUNICATING WITH ELECTRIC MOTORS

BACKGROUND

The field of the invention relates generally to electric motors, and more specifically, to methods and systems for communicating with electric motors.

Known methods for diagnosing an electric motor involve a technician plugging diagnostic equipment into the motor and/or a physical inspection of the motor. However, for some applications, such as commercial refrigeration applications that may have hundreds of motors in use, inspection is a time-consuming process. Additionally, the motors are typically installed inside refrigeration units at locations that may be difficult to access. Often, when a technician takes a motor to a service facility for inspection, they find that the motor operates normally and has not experienced any faults, such as unscheduled shut downs. One proposed solution to these problems involves installing a wireless communication device within the motor so it may be accessed and inspected remotely. However, costs associated with adding the wireless communication device typically exceed the cost of the motor itself.

BRIEF DESCRIPTION

In one aspect, a motor controller for an electric motor is described. The motor controller is coupled to a power line communication connection and includes a communication device coupled to a memory device. The motor controller is configured to receive, using the communication device, a status query from a server computing device via the power line communication connection. The motor controller is additionally configured to transmit electric motor diagnostic data from the memory device to the server computing device via the power line communication connection. The motor controller is further configured to receive motor configuration data from a client computing device wirelessly coupled to the motor controller. The motor configuration data is for controlling the electric motor. The motor controller is also configured to operate the electric motor in accordance with the motor configuration data.

In another aspect, a motor controller for an electric motor is described. The motor controller is coupled to a power line communication connection and includes a communication device coupled to a memory device. The motor controller is configured to receive motor configuration data from a client computing device wirelessly coupled to the motor controller and store the motor configuration data in the memory device. The motor configuration data is for controlling the electric motor. The motor controller is also configured to operate the electric motor in accordance with the motor configuration data.

In another aspect, a method of operating an electric motor is provided. The method is implemented by a motor controller coupled to the electric motor, wherein the motor controller is coupled to a power line communication connection and includes a communication device coupled to a memory device. The method includes receiving, using the communication device, a status query for the electric motor from a server computing device via the power line communication connection. The method also includes transmitting diagnostic data for the electric motor from the memory device to the server computing device and storing motor configuration data for controlling the electric motor in the memory device. The motor configuration data is received from a client computing device wirelessly coupled to the motor controller. The method further includes operating the electric motor in accordance with the motor configuration data.

In yet another aspect, an electric motor communication system is provided. The system includes a plurality of electric motors communicatively coupled to a power line communication connection. Each of the plurality of electric motors includes a motor controller having a communication device coupled to a memory device. The motor controller is configured to receive, using the communication device, a status query for an electric motor via the power line communication connection. The motor controller is additionally configured to transmit electric motor diagnostic data via the power line communication connection and receive motor configuration data for controlling the electric motor. The motor controller is also configured to operate the electric motor in accordance with the motor configuration data. The communication system also includes a server computing device communicatively coupled to each electric motor via the power line communication connection. The server computing device is configured to transmit the electric motor status query to the motor controller via the power line communication connection. The communication system further includes at least one client computing device in communication with at least one of the plurality of electric motors. The client computing device is configured to wirelessly transmit the motor configuration data to the motor controller.

DRAWINGS

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
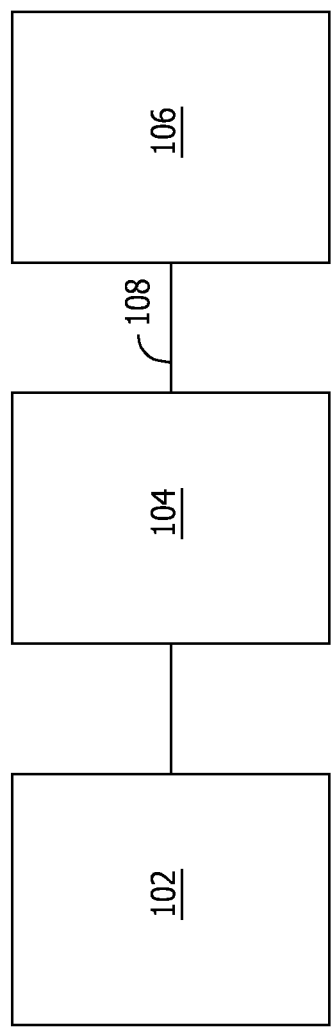
FIG. 1 is a block diagram of an exemplary electric motor assembly.

FIG. 1 is a block diagram of an exemplary electric motor assembly 100. Motor controller 102 is coupled to motor 104.

In this description, "coupled to" means included within, integrated with, physically connected to, or in electrical communication with another component. In some implementations, motor 104 is an electric motor. In some implementations, motor 104 is a variable speed electric motor, such as an electronically commutated motor (ECM). Motor 104 drives a load 106, such as a fan in a heating, ventilation, and air conditioning (HVAC) system or a refrigeration system, or an impeller in a pump. Motor 104 is coupled to load 106 by a shaft 108.

Motor controller 102 is configured to operate motor 104 according to settings stored in a memory device 310 (FIG. 3) of motor controller 102. The settings may include modes of operation, wherein each mode is associated with a time period and a speed. Additionally, motor controller 102 stores diagnostic data in memory device 310. The diagnostic data includes at least one record of a status of motor 104. For example, the diagnostic data may include a record of a fault, such as a shutdown of motor 104 that was not performed in response to a user-initiated command to shut down the motor. For example, motor 104 may have shut down because of an overheating condition, an over current condition, an over voltage condition, or another condition that exceeds operating parameters for which motor 104 was designed. The diagnostic data may additionally or alternatively include a record of another anomaly that indicates that motor 104 is operating outside of predetermined operating parameters and that may indicate an issue with the installation of motor 104. Diagnostic information may further include, for example, input power consumption, operating speed, operating torque level, operating temperature, frequency of thermostat cycling, total number of failures of electric motor 104 (fault event count), total length of time that motor 104 has received power (total powered time), total length of time that motor 104 has operated at or above a preset threshold (total run time), total length of time that motor 104 has operated at a speed that exceeds a preset rate of speed (total time in a cutback region), total time that motor 104 has operated with a baseplate temperature over a preset thermal limit (total time over thermal limit), and/or total number of times that motor 104 has been started (total run cycles).

Figure 2:
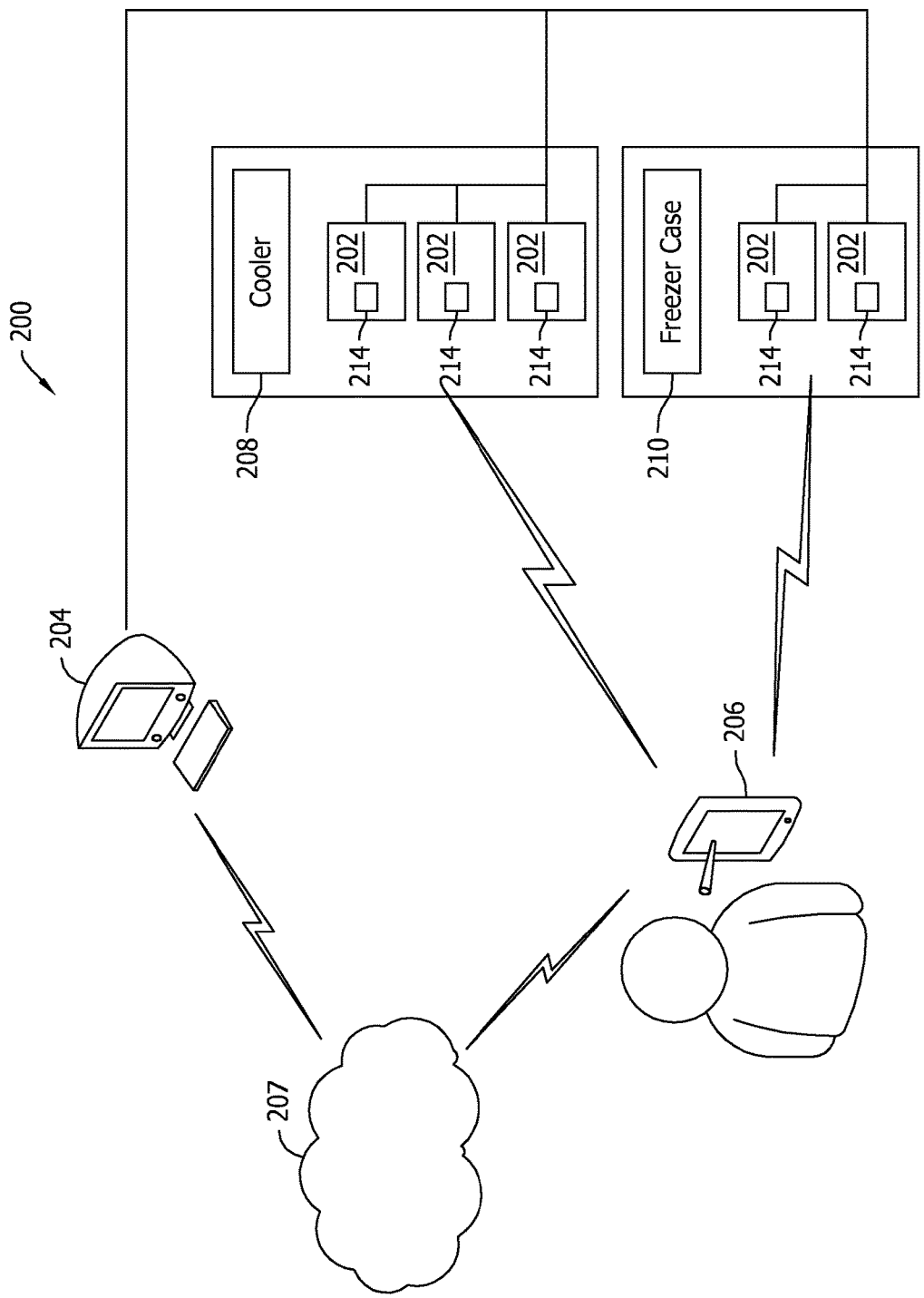
FIG. 2 is a block diagram of an exemplary electric motor diagnostics and control network.

FIG. 2 is a block diagram of an exemplary electric motor communication system 200. In the exemplary embodiment, system 200 includes a plurality of electric motors 202, such as electric motor 104 (shown in FIG. 1), at least one server computing device 204, and at least one client computing device 206. As described in detail herein, electric motor 202 is communicatively coupled to server computing device 204 for reporting diagnostic data, and is coupled to client computing device 206 so that a technician can transmit programming instructions and/or motor configuration data to motor 202. Client computing device 206 is communicatively coupled to server computing device 204 via the Internet 207 for communicating information regarding motors 202.

In the exemplary embodiment, motors 202 are utilized as fan and/or blower motors in a commercial refrigeration system. Accordingly, motors 202 are coupled to at least one cooler unit 208 or at least one freezer case 210. Alternatively, electric motors 202 may be implemented in a clean room filtering system, a fan filter unit, a variable air volume system, a refrigeration system, a furnace system, an air conditioning system, and/or a residential or commercial heating, ventilation, air conditioning (HVAC) system, and/or any other application that enables electric motor diagnostics and control network 200 to function as described herein. Electric motors 202 may also be used to drive mechanical components other than a fan and/or blower, including mixers, gears, conveyors, and/or treadmills.

Each motor 202 includes a motor controller 214 that controls operation of electric motor 202 and facilitates communication between electric motor 202, server computing device 204, and client computing device 206, as described in detail below. In the exemplary embodiment, motor controller 214 transmits and receives signals to and from server computing device 204. Server computing device 204 is on-location with motors 202 and is configured to communicate with motor controllers 214 to obtain identification data and the diagnostic data from motors 202. Client computing device 206 is a portable computing device used by a service technician that wirelessly communicates with server computing device 204 to receive service requests, identification data, and/or diagnostic data pertaining to motors 202. Client computing device 206 is also configured to transmit an alert request signal and/or motor configuration data to motor controller 214.

Figure 3:
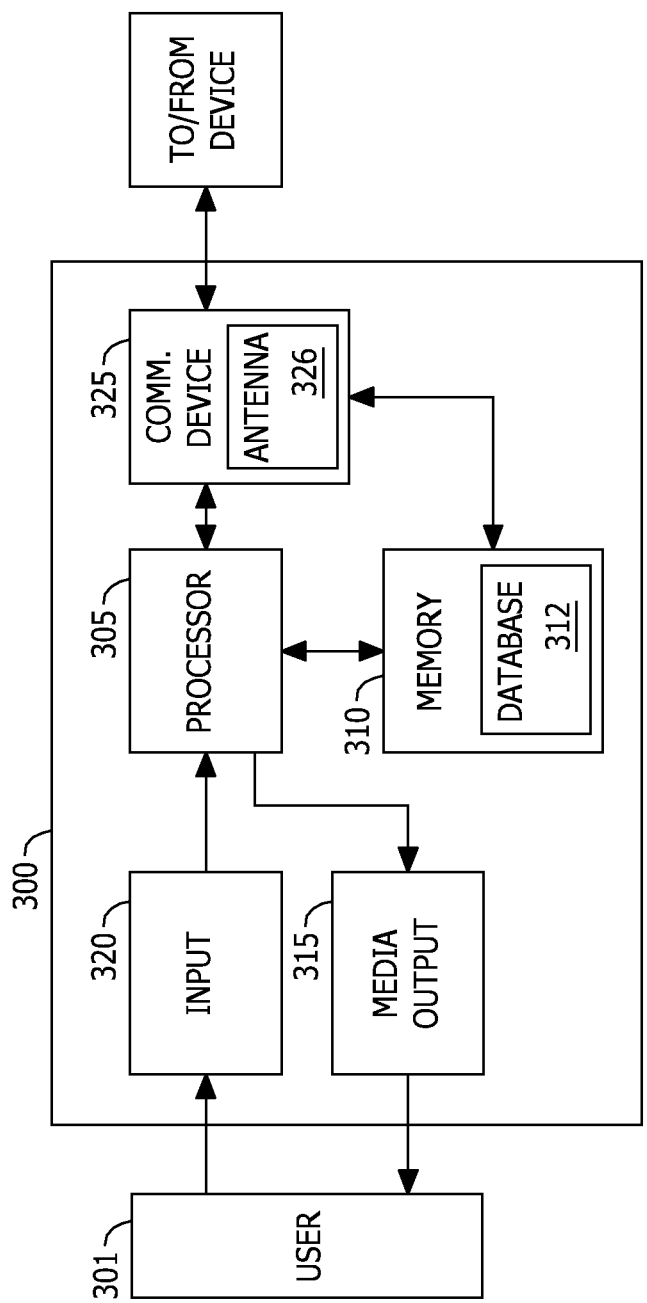
FIG. 3 is a block diagram of an exemplary computing device.

FIG. 3 is a block diagram of an exemplary computing device 300. For example, motor controller 214, client computing device 206, and server computing device 204 may be implementations of computing device 300. Computing device 300 includes a processor 305 for executing instructions. In some implementations, executable instructions are stored in a memory device 310 to enable computing device 300 to carry out processes described herein. Processor 305 may include one or more processing units (e.g., in a multi-core configuration). Memory device 310 is any device allowing information such as executable instructions and/or other data to be stored and retrieved. Memory device 310 may include a database 312. For example, with respect to server computing device 204, database 312 may include customer account numbers and identification data for motors (e.g., motor 202) manufactured by a particular manufacturer. In some implementations, database 312 may instead be external to, and in communication with, computing device 300, rather than being included within computing device 300. In some implementations, memory device 310 may be separated into multiple memory devices.

In some implementations, computing device 300 also includes at least one media output component 315 for presenting information to user 301. Media output component 315 is any component capable of conveying information to user 301. In some implementations, media output component 315 includes an output adapter such as a video adapter and/or an audio adapter. An output adapter is operatively coupled to processor 305 and is operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 300 includes an input device 320 for receiving input from user 301. Input device 320 may include, for example, one or more buttons, a keypad, a touch sensitive panel (e.g., a touch pad or a touch screen), and/or a microphone. A single component such as a touch screen may function as both an output device of media output component 315 and input device 320.

Computing device 300 may also include a communication device 325, which is communicatively couplable to another device. For example, client computing device 206 may communicatively couple with motor controller 102 and server computing device 204 using communication device 325. Communication device 325 may include, for example, a wired or wireless network adapter or a wireless data transceiver for use with a mobile phone network (e.g., Global System for Mobile communications (GSM), 3G, 4G), a short-range wireless network (e.g., Bluetooth), or other mobile data network (e.g., Worldwide Interoperability for Microwave Access (WIMAX)). In some implementations, communication device 325, particularly in implementations in which communication device 325 communicates wirelessly, is coupled to an antenna 326. In some implementations, particularly with regard to motor controller 214 and client computing device 206, communication device 325 is capable of performing near field communication (NFC). Additionally, in some implementations, computing device 300 may use power received through antenna 326 to perform operations, without receiving or relying on power from any other power source, as described herein. For example, in some implementations, antenna 326 is directly connected to memory device 310. In such implementations, memory device 310 and/or communication device 325 derive power from antenna 326 and thereby enable commissioning and programming operations to take place when motor 202, motor controller 214, and processor 305 do not have power. This allows customers and service technicians to communicate with motor 202 and/or motor controller 214 without host system power or even while motor 202 is packaged or crated for shipment. As described herein, wireless communication takes place with memory device 310 at any time (with or without power), and processor 305 accesses memory device 310 only when power is applied. With power applied, processor 305 accesses memory device 310 and determines if there is new information, commands, etc. Electronic communications with and between motors 202 may include, but are not limited to, motor failure warnings and alerts, system clogged airflow warnings, which could be due to ice and/or a clogged filter, system air leak detection, which could be due to a door open and/or a bad seal, and make-up air delivery for weak or blocked motors in cabinets with more than one motor.

Figure 4:
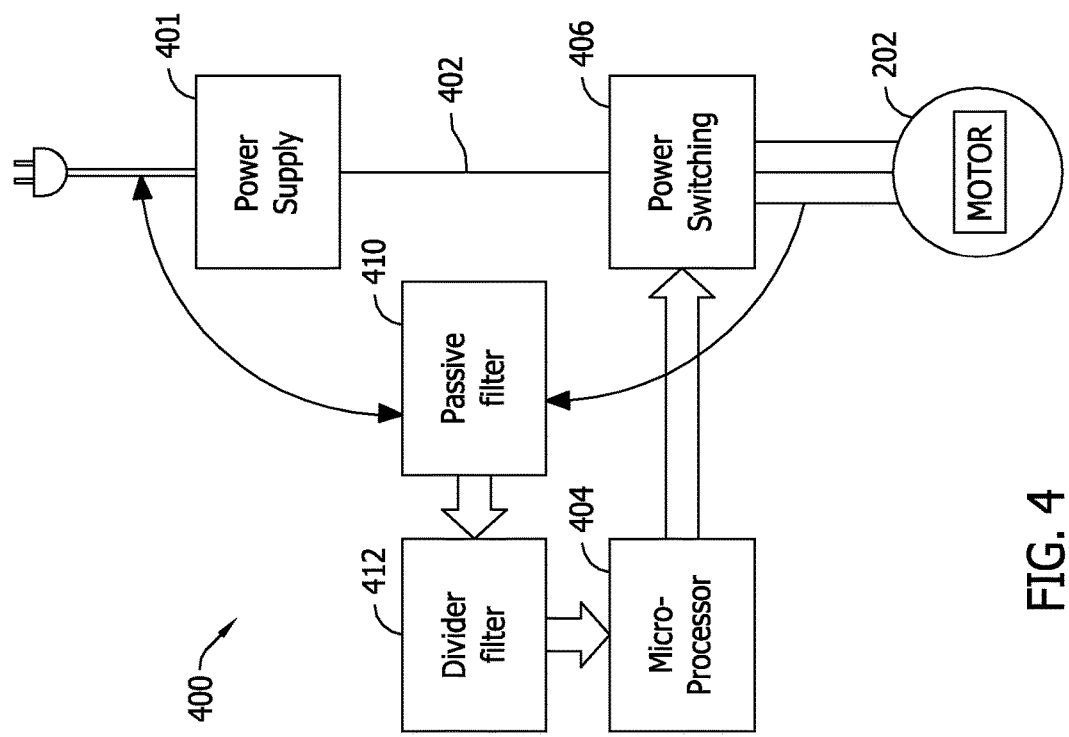
FIG. 4 is a block diagram of an exemplary motor controller.

FIG. 4 is a block diagram of an exemplary motor controller 400. In the exemplary embodiment, motor controller 400 is similar to motor controller 214 (shown in FIG. 2). Motor controller 400 is coupled to and receives power from a power supply 401 via a power line communication connection 402. Power line communication connection 402 is configured for power-line communication, enabling motor controllers 400 to communicate with one another and server computing device 204. A microprocessor 404 retrieves stored programming data from a memory, for example, memory device 310 (shown in FIG. 3), and transmits control signals to a power switching device 406. Power switching device 406 conditions the received power based on the control signals received from microprocessor 404 for application to electric motor 202 (shown in FIG. 2).

A passive filter 410 couples an output of power switches 406 back to power line communication connection 402, passing only outgoing high-frequency communications transmitted by motor controller 400. The outgoing communications are transmitted via power line communication connection 402 to one or more other motor controllers 400 and/or server computing device 204. Incoming communications have a high frequency relative to the AC power input. The incoming communications are filtered by passive filter 410 and are divided off by a divider 412. The filtered and divided incoming communications are then transmitted to microprocessor 406 for processing.

In the exemplary embodiment, motor controller 400 is configured to cause motor 202 to generate an audible alert to assist a technician in locating and identifying a particular motor within network 150 (shown in FIG. 2). The technician uses client computing device 206 to transmit an alert request signal to motor 202. In one embodiment, the alert request signal is transmitted from client computing device 206 over the Internet 212 to server computing device 204, and from server computing device 204 to motor 202 via power line communication connection 402. In another embodiment, client computing device 206 transmits the alert request signal to motor controller 400 using NFC.

Upon receiving the alert request signal by motor controller 400, microprocessor 406 outputs a low frequency pulse width modulated (PWM) waveform to generate an audible noise or alert. A low frequency signal (i.e., 20 Hz-10 kHz) generated by the PWM waveform energizes windings of motor 202 to generate an audible, high pitch sound. The motor windings may be energized to generate the audible alert during normal operation (rotation) or while the motor is at rest. The audible sound may be interpreted by a third party, such as a technician or an electronic device. Microprocessor 406 may use multiple frequencies and multiple sound patterns (i.e., high-low-high or short-long-short) to relay different information. In an alternative embodiment, motor controller 400 is programmed to generate the audible alert upon occurrence of one or more predetermined events. In such an embodiment, motor 202 does not have to receive an alert request signal and/or does not have to be coupled to network 150. For example, motor controller may be programmed to automatically generate an audible alert that has a specified pattern upon the occurrence of a motor fault.

In the exemplary embodiment, during operation, diagnostic data is stored in memory device 310 (shown in FIG. 3). In one embodiment, motor controller 400 periodically transmits, using communication device 325, diagnostic data about the health and operating condition of motor 202 to server computing device 204. In another embodiment, motor controller 400 transmits the diagnostic data only when operating parameters fall outside of predefined operating ranges. In yet another embodiment, motor controller 400 transmits the diagnostic data upon receiving a diagnostic inquiry from server computing device 204. The diagnostic data is transmitted over power supply line 402 and is received by server computing device 204 and/or other motor controllers 400.

When the diagnostic data indicates service is needed on motor 202, a technician is employed to service motor 202. In a commercial refrigeration environment, there may be hundreds of motors 202 making it difficult to locate a specific motor. To locate and identify damaged motor 202, the technician uses client computing device 206 to transmit an alert request signal to server computing device 204 via the Internet. In turn, server computing device 204 transmits the alert request signal to damaged motor 202 via power line communication connection 402. Upon receipt of the alert request signal, motor controller 400 associated with damaged motor 202 generates an audible alert, as described above.

After location and identification of damaged motor 202, the technician may begin servicing damaged motor 202. The technician uses client computing device 206 to communicate with motor controller 400 using NFC. In one embodiment, the technician may provide new or updated programming instructions to correct the operations of damaged motor 202. NFC enables the technician to change operating parameters of motor 202 without going through the difficult process of physical accessing motor 202. In another embodiment, if motor 202 is physically damaged, the technician may install a new motor 202. Using client computing device 206, the technician provides programming data to new motor 202 using NFC such that new motor 202 operates in the same manner as did damaged motor 202.

Embodiments of the systems and methods described herein enable one or a plurality of electric motors to be monitored from a central computer device. The motors communicate diagnostic data over a power line communication connection. If a fault has occurred in one or more of the motors, a technician is called to inspect the motors. Because there could be hundreds of motors in operation, the systems and methods described herein enable the technician to use a computing device (i.e., a SmartPhone or tablet) to transmit an alert request signal to a particular motor. The motor generates an audible alert that assists the technician in locating the motor. Further, the technician can use near field communication to program and/or diagnose the motor, rather than having to physically plug into the motor. Accordingly, embodiments of the systems and methods described herein may eliminate the need to physically access a motor for programming and/or inspection. The systems and methods described herein also make it easier to identify when a motor has a fault and to identify the location of that particular motor.

A technical effect of the methods and systems described herein may include one or more of: (a) receiving, using a communication device, a status query for an electric motor from a server computing device via a power line communication connection; (b) transmitting diagnostic data for the electric motor from a memory device to the server computing device; (c) receiving motor configuration data from a client computing device wirelessly coupled to the motor controller, the motor configuration data for controlling the electric motor; and (d) operating the electric motor in accordance with the motor configuration data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A motor controller for an electric motor, said motor controller comprising:
    a power cable configured to receive alternating current (AC) input power having a first frequency from a power supply for powering the electric motor, said power cable configured to transmit data signals between said motor controller and one or more external computing devices;
    a communication device configured to transmit and receive the data signals via said power cable;
    a power switching device coupled to said power cable and configured to condition the AC input power received from the power supply for powering the electric motor, said power switching device configured to generate data signals having a second frequency that is greater than the first frequency;
    a passive filter coupled to an output of said power switching device and to said power cable, said passive filter configured to pass signals generated by said power switching device that have frequencies greater than the first frequency to said power cable, and route signals incoming on said power cable that have frequencies greater than the first frequency for processing; and
    a processor configured to:
    receive, using said communication device, a status query from a server computing device via said power cable;
    retrieve electric motor diagnostic data stored in a memory device;
    switch said power switching device at the second frequency to generate a data signal at the output of said power switching device, the data signal including the electric motor diagnostic data;
    transfer, using said passive filter, the data signal having the second frequency onto said power cable;
    transmit the electric motor diagnostic data to the server computing device via said power cable;
    receive motor configuration data from a client computing device wirelessly coupled to said motor controller, the motor configuration data for controlling the electric motor; and
    operate the electric motor in accordance with the motor configuration data.

2. A motor controller in accordance with claim 1, wherein said passive filter is configured to filter communication signals received by or transmitted from said motor controller.

3. A motor controller in accordance with claim 2, wherein said passive filter couples an output of said power switching device to the power cable for transmitting outgoing communications from said motor controller.

4. A motor controller in accordance with claim 3, wherein outgoing communications further include motor identification data.

5. A motor controller in accordance with claim 2, wherein said passive filter is further configured to pass incoming communications having a frequency greater than 60 Hz to said power cable.

6. A motor controller in accordance with claim 5, wherein incoming communications include diagnostic data from at least one of a plurality of other electric motors coupled to said power cable.

7. A motor controller in accordance with claim 6, wherein said motor controller is further configured to alter operation of the electric motor based on the diagnostic data from the at least one of the plurality of other electric motors.

8. A motor controller in accordance with claim 5, wherein said passive filter transmits the passed incoming communications to a processing device configured to provide control signals to said power switching device for controlling operation of the electric motor.

9. A method of operating an electric motor, said method implemented by a motor controller coupled to the electric motor, wherein the motor controller includes a communication device coupled to a memory device, said method comprising:
    coupling a power cable to a power supply to receive alternating current (AC) input power having a first frequency for powering the electric motor, the power cable configured to transmit data signals between the motor controller and one or more external computing devices;
    conditioning, by a power switching device, the AC input power received from the power supply for powering the electric motor;
    filtering, by a passive filter coupled to an output of the power switching device and to the power cable, signals incoming on the power cable that have frequencies greater than the first frequency for processing, and passing signals generated by the power switching device that have frequencies greater than the first frequency to the power cable;

receiving, using the communication device, a status query from a server computing device via the power cable;

retrieving electric motor diagnostic data stored in a memory device;

switching the power switching device at a second frequency greater than the first frequency to generate a data signal at an output of the power switching device, the data signal including the electric motor diagnostic data;

transferring, using the passive filter, the data signal having the second frequency onto the power cable;

transmitting the electric motor diagnostic data to the server computing device via the power cable;

receiving, from a client computing device wirelessly coupled to the motor controller, motor configuration data for controlling the electric motor; and operating the electric motor in accordance with the motor configuration data.

10. A method in accordance with claim 9, further comprising filtering, by a passive filter, at least one of incoming and outgoing communications having a frequency greater than a predefined threshold.

11. A method in accordance with claim 9, further comprising outputting, by the motor controller, a low-frequency pulse width modulated (PWM) waveform signal configured to energize windings of the electric motor to cause the electric motor to generate an audible alert that facilitates identifying a specific electric motor of a plurality of electric motors.

12. A method in accordance with claim 9, further comprising storing the motor configuration data using power wirelessly received by the communication device from the client computing device.

13. A method in accordance with claim 9, further comprising receiving the motor configuration data from the client computing device using near field communication.

14. An electric motor communication system comprising:

a plurality of electric motors communicatively coupled to a power line communication connection, each electric motor of said plurality of electric motors including a motor controller comprising:

a power cable configured to receive alternating current (AC) input power having a first frequency from a power supply for powering the electric motor, said power cable configured to transmit data signals between said motor controller and one or more external computing devices;

a communication device configured to transmit and receive the data signals via said power cable;

a power switching device coupled to said power cable and configured to condition the AC input power received from the power supply for powering the electric motor at the first frequency, said power switching device configured to generate data signals having a second frequency that is greater than the first frequency;

a passive filter coupled to an output of said power switching device and to said power cable, said passive filter configured to pass signals generated by said power switching device that have frequencies greater than the first frequency to said power cable, and route signals incoming on said power cable that have frequencies greater than the first frequency for processing; and a processor configured to:

receive, using said communication device, a status query for an electric motor via said power cable;

retrieve electric motor diagnostic data stored in a memory device;

switch said power switching device at the second frequency to generate a data signal at the output of said power switching device, the data signal including the electric motor diagnostic data;

transfer, using said passive filter, the data signal having the second frequency onto said power cable;

transmit the electric motor diagnostic data to the server computing device via said power cable;

receive motor configuration data for controlling the electric motor; and operate said electric motor in accordance with the motor configuration data;

a server computing device communicatively coupled to said each electric motor via said power cable, said server computing device configured to transmit the electric motor status query to said motor controller via said power cable; and at least one client computing device in communication with at least one of said plurality of electric motors, said at least one client computing device configured to wirelessly transmit the motor configuration data to said motor controller.

* * * * *